United States Patent [19]

Tostado

[11] Patent Number: 5,265,907
[45] Date of Patent: Nov. 30, 1993

[54] AUXILIARY SUSPENSION ASSEMBLY FOR FORD "F" AND "E" SERIES TRUCKS

[76] Inventor: Ray Tostado, 915 W. Kensington Rd., Los Angeles, Calif. 90026

[21] Appl. No.: 665,554

[22] Filed: Mar. 5, 1991

[51] Int. Cl.[5] .............................................. B60G 11/28
[52] U.S. Cl. .................................... 280/788; 280/713
[58] Field of Search ............... 280/711, 712, 713, 702, 280/688, 724, 725

[56] References Cited

U.S. PATENT DOCUMENTS

| | | | |
|---|---|---|---|
| 3,592,485 | 7/1971 | Buhl | 280/712 |
| 3,730,548 | 5/1973 | Thaxton | 280/712 |
| 3,735,999 | 5/1973 | Blackledge | 280/693 |
| 4,943,081 | 7/1990 | Golpe | 280/725 |

OTHER PUBLICATIONS

Ridewell's Air Ride 226 R Angular Beam Suspension, brochure handed out at truck show Apr. 1990.

*Primary Examiner*—Karin L. Tyson
*Attorney, Agent, or Firm*—Blakeley, Sokoloff, Taylor, Zafman

[57] ABSTRACT

A suspension assembly that has two brackets that can be bolted into existing holes in the frame and chassis radius arms of an automobile. An air bag or other shock absorbing device is mounted between the brackets to provide an additional suspension functions between the vehicle frame and axle. The brackets are constructed to bolt into existing holes in the axle radius arms and motor mount of a vehicle, particularly trucks sold by Ford Motor, Co. under the designation E-series and F-series. The whole assembly can be mounted using a simple wrench, which allows easy assembly and detachment in any environment.

5 Claims, 2 Drawing Sheets

AUXILIARY SUSPENSION ASSEMBLY FOR FORD "F" AND "E" SERIES TRUCKS

BACKGROUND OF THE INVENTION

1. Field of the Invention

This invention relates to a damper assembly that can be installed into a factory built automobile.

2. Description of Related Art

Vehicles typically come factory equipped with air shocks and coils that dampen out any shocks or vibrational loads induced onto the vehicle. There are some situations where it is desirable to mount additional suspension improvements on a vehicle to provide added comfort, or increase the load carrying capabilities of the suspension system. For instance, a truck that is driven "off road" might require a heavier load carrying system to absorb the bumps in such terrain. Typically modifying a truck in such a manner entails welding additional plates to the frame and chassis, a time consuming process that requires welding equipment etc, which is not found in the average home. The attachment of the plates by means such as welding also produces a permanent structure, wherein the truck has additional suspension devices even though the devices are no longer needed or desired. What is needed is a suspension assembly that can be easily installed and detached from a vehicle, that does not modify the vehicle itself or require any exotic tools.

SUMMARY OF THE INVENTION

The present invention is a suspension assembly that has two brackets that can be bolted into existing holes in the frame and I-beam radius arms of a vehicle. An air bag or other shock absorbing device is mounted between the brackets to provide an additional suspension between the vehicle frame and axles. The brackets are constructed to bolt into existing holes, when available, in the chassis radius arms and motor mount cross member of select vehicles, particularly trucks sold by Ford Motor, Co. under the designation E-series and F-series. The whole assembly can be mounted using simple wrenches, which allows easy assembly and detachment in any environment.

Therefore it is an object of this invention to provide an auxiliary suspension assembly that can be easily added to a factory stocked vehicle without any major modification of the vehicle.

It is also an object of this invention to provide a suspension assembly that can be easily mounted and detached from a vehicle using tools typically found in the garage of the average person.

BRIEF DESCRIPTION OF THE DRAWINGS

The objects and advantages of the present invention will become more readily apparent to those skilled in the art after reviewing the following detailed description and accompanying drawings, wherein.

DETAILED DESCRIPTION OF THE INVENTION

Figure 1:
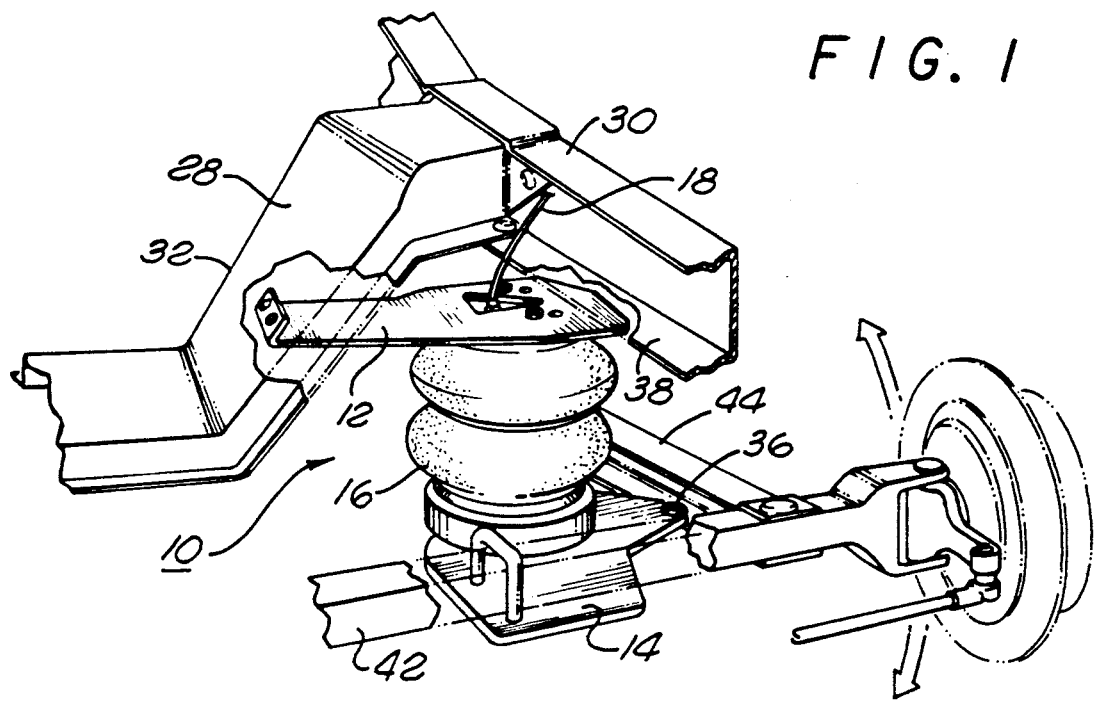
FIG. 1 is a perspective view of a damper assembly of the present invention mounted between the frame and axle radius arm of a vehicle.

Referring to the drawings more particularly by reference numbers, FIGS. 1–4 show a suspension assembly 10 of the present invention attached to a vehicle. The assembly 10 includes an upper bracket 12 a lower bracket 14 and an air bag 16. Although an air bag 16 is shown and will be discussed, it is to be understood that any type of damper including but not limited to an air shock, air strut or any other type of shock absorber can be used in the present invention. The air bag 16 is essentially an inflated bladder with a input hose 18 that is accessible so that the bag can be easily inflated. Such a device is sold by Firestone, Inc. under the tradename AIR-RITE. The air bag 16 will typically have a pair of end plates each with a pair of bolts 20 extending from the surface thereof. The brackets have clearance holes 22 that allow the bolts 20 to be inserted, such that nuts 24 can be threaded onto the bolts 20 to attach the bag 16 to the brackets. The upper plate 12 can have an additional set of holes 22' so that the air bag 16 can be installed in different size vehicles. The holes of the upper bracket 12 can be slotted 22" to compensate for deviations between the upper and lower mounted plates for each individual automobile. The upper bracket 12 may further have an opening 26 to allow the hose 18 of the bag to extend through the bracket 12.

Figure 3:
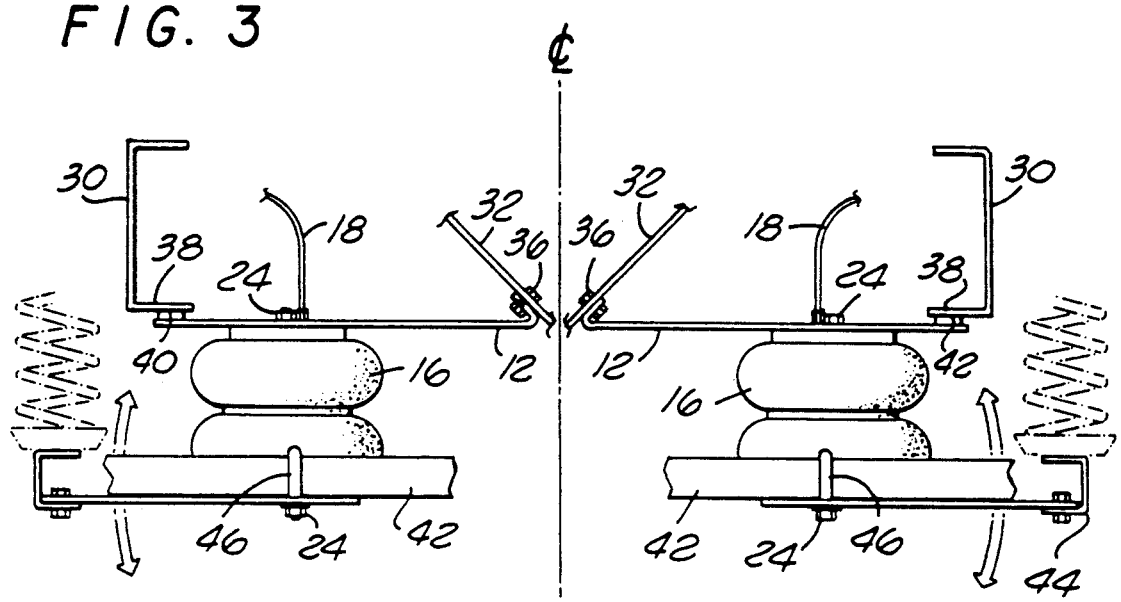
FIG. 3 is a side view of the damper assembly bolted to the frame and axle radius arm, showing a spacer plate between one end of the upper bracket and the frame.

The brackets 12 and 14 are bolted to the automobile as shown in FIG. 1. The vehicle typically being a truck that has a motor mount crossmember 28 attached to a frame rail 30. The crossmember 28 has a folded section 32 that extends downward from the rail 30. It has been found that the Ford "E" and "F" series trucks have existing holes in the folded section 32 through which the upper bracket 12 can be attached. The upper bracket 12 has a flange 34 at one end with a pair of holes 20 that allow bolts 36 to extend through the frame 28 and the flange 34. The flange 34 is constructed at an oblique angle to allow a flush fit with the folded section 32. As shown in FIG. 3, the upper bracket 12 extends from the folded section 32 to the frame rail 30. The frame rail 30 typically being constructed from "C" channel stock steel, with a lower flange 38 therein. Inserted between the lower flange 38 and the upper bracket 12 is a spacer plate 40 which can be constructed in varying thicknesses, depending upon the thickness of the upper bracket 12, and the vertical distance between the lower flange 38 and the holes in the folded section 32. As shown in FIG. 3, the air bag 16 is closer to the spacer plate 40 than the other end of the upper bracket 12, such that the spacer plate 40 is the primary load bearing member. This arrangement reduces the stresses seen by the bolts 36 which are generally weaker than the solid plate. The spacer 40 should be preferably thicker than the space between the upper bracket 12 and the lower flange 38, so that the upper bracket 12 is deflected when the spacer 40 is installed. The deflected bracket produces a force on the spacer 40 to hold the spacer 40 in place. The force should be sufficient to prevent the spacer 40 from falling out when the chassis is subjected to vibrational loading.

Figure 2:
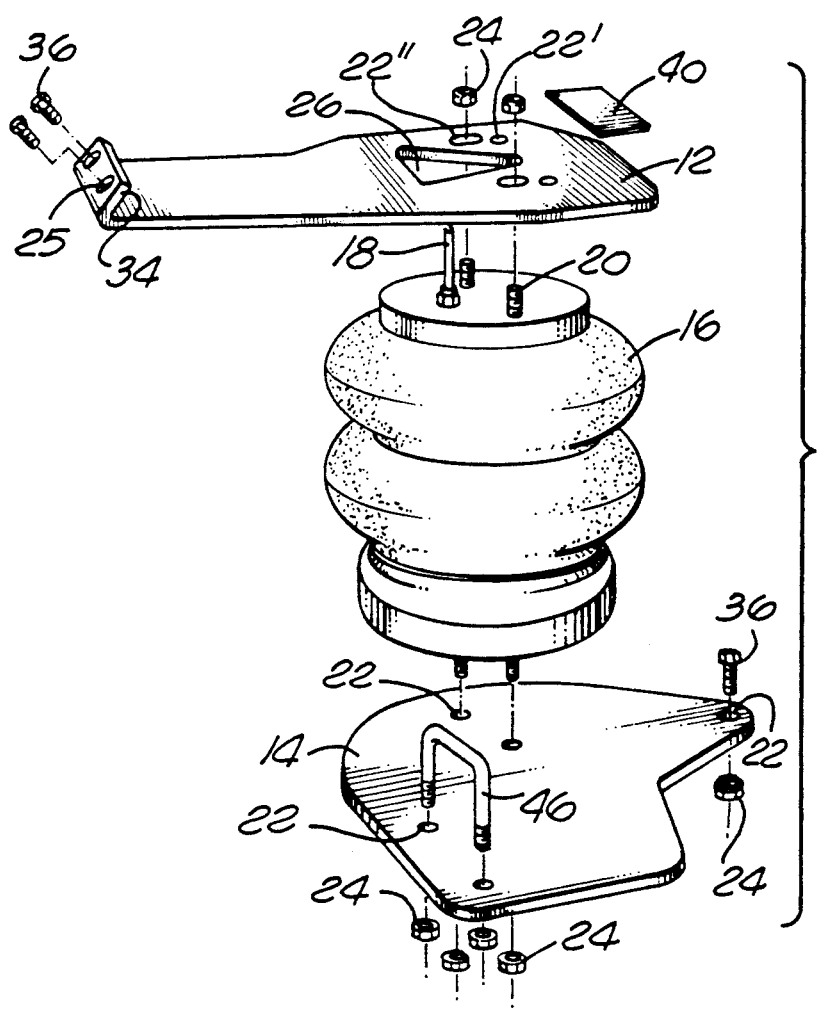
FIG. 2 is an exploded view of the suspension assembly of FIG. 1, showing an air bag between an upper and lower bracket.
Figure 4:
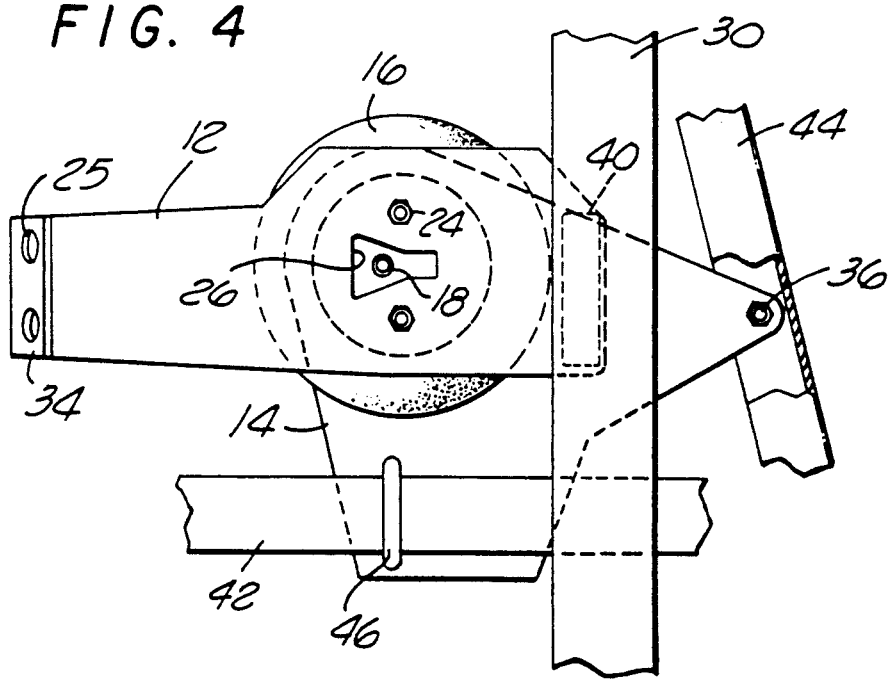
FIG. 4 is a top view of the damper assembly of FIG. 3, showing the attachment of the lower bracket to the chassis.

The lower bracket 14 extends from an "I" beam axle 42 to a radius arm 44 as shown in FIG. 4. The radius arm 44 is typically a "C" channel with an existing hole that allows one end of the bracket 14 to be bolted thereto. It has been found that the Ford "E" and "F" series trucks have such an existing hole. The other end of the bracket 14 is attached to the axle 42 with a "U" bolt 46 that wraps around the axle 42 and is bolted to the lower bracket 14 through holes 22 as shown in FIGS. 2 and 3.

Although the figures show a right section of a vehicle front frame and chassis, it is to be understood that the suspension assembly can also be mounted to the left section of the vehicle. The assembly 10 is mounted without any modification to the vehicle itself and can be installed with a simple wrench. It being found that total assembly can be performed in 30 minutes. Although the brackets shown and described are specifically constructed for use with "E" and "F" series Ford trucks, it is to be understood that the bracket size and shape can be modified to fit any vehicle that complements the invention design using the motor mount crossmember and axle radius arm, and sufficient space to install a suspension device.

While certain exemplary embodiments have been described in detail and shown in the accompanying drawings, it is to be understood that such embodiments are merely illustrative of, and not restrictive on the broad invention, and that this invention not be limited to the specific constructions and arrangements shown and described since various other modifications may occur to those ordinarily skilled in the art.

What is claimed is:

1. An auxiliary suspension assembly mounted in a suspension system of an automobile, comprising:
   a left axle beam;
   a left radius arm attached to said left axle beam, said left radius arm having a hole therein;
   a right axle beam;
   a right radius arm attached to said right axle beam, said right radius arm having a hole therein;
   a left frame rail;
   a right frame rail;
   a motor mount crossmember attached to said left and right frame rails, said motor mount crossmember having left and right folded sections that extend from said left and right frame rails to said left and right axle beams, respectively, each said left and right folded sections having a pair of holes therein;
   a first left bracket plate extending from said left axle beam to said left radius arm attached by fastener means to said left axle beam and bolted to said left radius arm through said hole in said left radius arm;
   a second left bracket plate extending from said left folded section of said motor mount crossmember to said left frame rail, said left bracket plate being bolted to said motor mount crossmember through said pair of holes in said left folded section of said motor mount crossmember;
   a left spacer plate securely inserted between said left frame rail and said second left bracket plate;
   left damper means connected to said first left bracket plate and said second left bracket plate;
   a first right bracket plate extending from said right axle beam to said right radius arm attached by fastener means to said right axle beam and bolted to said right radius arm through said hole in said right radius arm;
   a second right bracket plate extending from said right folded section of said motor mount crossmember to said right frame rail, said right bracket plate being bolted to said motor mount crossmember through said pair of holes in said right folded section of said motor mount crossmember;
   a right spacer plate securely inserted between said right frame rail and said second right bracket plate; and,
   right damper means connected to said first right bracket plate and said second right bracket plate.

2. The assembly as recited in claim 1, wherein said left and right damper means are air bags.

3. The assembly as recited in claim 1, wherein said left and right damper means are air shocks.

4. The assembly as recited in claim 1, wherein said left and right first bracket plate fastener means are U bolts.

5. An auxiliary suspension assembly mounted in a suspension system of an automobile, comprising:
   a left axle beam;
   a left radius arm attached to said left axle beam, said left radius arm having a hole therein;
   a right axle beam;
   a right radius arm attached to said right axle beam, said right radius arm having a hole therein;
   a left frame rail;
   a right frame rail;
   a motor mount crossmember attached to said left and right frame rails, said motor mount crossmember having left and right folded sections that extend from said left and right frame rails to said left and right axle beams, respectively, each said left and right folded sections having a pair of holes therein;
   a first left bracket plate extending from said left axle beam to said left radius arm attached by a U bolt to said left axle beam and bolted to said left radius arm through said hole in said left radius arm;
   a second left bracket plate extending from said left folded section of said motor mount crossmember to said left frame rail, said second left bracket plate being bolted to said motor mount crossmember through said pair of holes in said left folded section of said motor mount crossmember;
   a left spacer plate securely inserted between said left frame rail and said second left bracket plate;
   a left air bag connected to said first left bracket plate and said second left bracket plate;
   a first right bracket plate extending from said right axle beam to said right radius arm attached by a U bolt to said right axle beam and bolted to said right radius arm through said hole in said right radius arm;
   a second right bracket plate extending from said right folded section of said motor mount crossmember to said right frame rail, said second right bracket plate being bolted to said motor mount crossmember through said pair of holes in said right folded section of said motor mount crossmember;
   a right spacer plate securely inserted between said right frame rail and said second right bracket plate; and,
   a right air bag connected to said first right bracket plate and said second right bracket plate.

* * * * *